United States Patent [19]

Kennedy et al.

[11] Patent Number: 4,987,986
[45] Date of Patent: Jan. 29, 1991

[54] ELECTROMAGNETICALLY ACTUATED VALVE PLATE FOR A VISCOUS FLUID FAN CLUTCH

[75] Inventors: Lawrence C. Kennedy, Kettering; James O. Strader, Jr., Spring Valley, both of Ohio

[73] Assignee: General Motors Corporation, Detroit, Mich.

[21] Appl. No.: 383,677

[22] Filed: Jul. 24, 1989

[51] Int. Cl.⁵ .............................. F16D 35/00
[52] U.S. Cl. ......................... 192/58 B; 192/84 R; 123/41.12
[58] Field of Search .............. 192/58 B, 82 T, 84 R; 123/41.12

[56] References Cited

U.S. PATENT DOCUMENTS

| | | | |
|---|---|---|---|
| 3,552,532 | 1/1971 | Thomas et al. | 192/58 |
| 4,271,945 | 6/1981 | Budinski | 192/58 B |
| 4,302,156 | 11/1981 | LaFlame | 416/169 A |
| 4,310,085 | 1/1982 | La Flame | 102/58 B |
| 4,346,797 | 8/1982 | Bopp | 192/58 B |
| 4,458,798 | 7/1984 | Bopp | 192/58 B |
| 4,556,138 | 12/1985 | Martin et al. | 192/58 B |
| 4,591,037 | 5/1986 | Bopp | 192/58 B |
| 4,741,421 | 5/1988 | Johnston | 192/58 B |
| 4,823,744 | 4/1989 | Omura | 123/41.12 |
| 4,874,072 | 10/1989 | Mohan et al. | 192/58 B |

FOREIGN PATENT DOCUMENTS 2633721 2/1977 Fed. Rep. of Germany .... 192/82 T

Primary Examiner—Rodney H. Bonck
Assistant Examiner—Nicholas Whitelaw
Attorney, Agent, or Firm—A. Michael Tucker

[57] ABSTRACT

A fan clutch assembly for a vehicle includes a flexible, ferromagnetic valve plate for controlling fluid flow through a pump plate into a shear zone. When an electromagnetic coil is energized, the resulting flux deflects the valve plate away from the pump plate to open fluid gates in the pump plate. When the coil is de-energized, the valve plate returns to its original engagement position against the pump plate to close the fluid gates.

2 Claims, 2 Drawing Sheets

ELECTROMAGNETICALLY ACTUATED VALVE PLATE FOR A VISCOUS FLUID FAN CLUTCH

BACKGROUND OF THE INVENTION

1. Field of the Invention

The present invention relates generally to a viscous fluid coupling device. In particular, the present invention is concerned with an electromagnetically actuated valve plate of a viscous fluid fan clutch for a vehicle.

2. Statement of the Related Art

A viscous fluid clutch assembly for driving and rotating a vehicle cooling fan is well-known. A multi-bladed fan is removably secured to a clutch body of the assembly. The fan and clutch assembly are installed between an accessory pulley of a vehicle engine (typically the water pump pulley) and a radiator. The clutch assembly drives the fan at high speeds close to input speed when cooling is required and permits the fan to rotate at low speeds when cooling is not required.

Typically, a clutch assembly utilizes a control device to vary the speed of the fan. When cooling is required, the control device causes the torque from an input shaft to be transferred to the attached fan. When cooling is not required, the input torque is not transferred to the fan, thereby reducing the load on an engine and improving efficiency.

In many clutch assemblies, a helically-wound bimetallic coil is utilized as a control device for changing the speed of a fan. Ambient air temperature causes winding and unwinding of the bimetallic coil so as to rotate a valve plate and control flow of fluid inside the clutch assembly. When fluid gates are opened, fluid travels to a shear zone so that fluid shear transmits input torque to the fan. When fluid gates are closed, the majority of fluid is pumped out of the shear zone and the fan speed is reduced.

The art continues to seek improvements. To improve efficiencies, it is desirable to monitor various operating characteristics of an engine, e.g. the temperature of an engine coolant fluid. When the temperature of a coolant fluid reaches a predetermined level, the engine cooling fan should be actuated. It is desirable that a viscous fluid clutch assembly be capable of controlling the speed of a fan based on the temperature of the engine coolant fluid and other strategically-monitored temperatures.

SUMMARY OF THE INVENTION

The present invention includes a viscous fluid drive device particularly adaptable for a fan clutch assembly of a vehicle. The present fan clutch assembly utilizes an electromagnetically actuated valve plate to control the flow of fluid inside the clutch assembly and the speed of a cooling fan. Various sensors can be strategically placed in an engine compartment and connected to an electronic control module or computer to energize an electromagnetic coil. When cooling is desired, the coil generates a flux to deflect the valve plate, thereby opening fluid gates and providing rotation of the fan.

The present invention includes a fan clutch assembly for a vehicle. The clutch assembly includes a flexible, ferromagnetic valve plate for controlling fluid flow through a pump plate into a shear zone. When an electromagnetic coil is energized, the resulting flux deflects the valve plate away from the pump plate to open fluid gates in the pump plate. When the coil is de-energized, the valve plate returns to its original engagement position against the pump plate to close the fluid gates.

DETAILED DESCRIPTION OF THE PREFERRED EMBODIMENT

Figure 1:
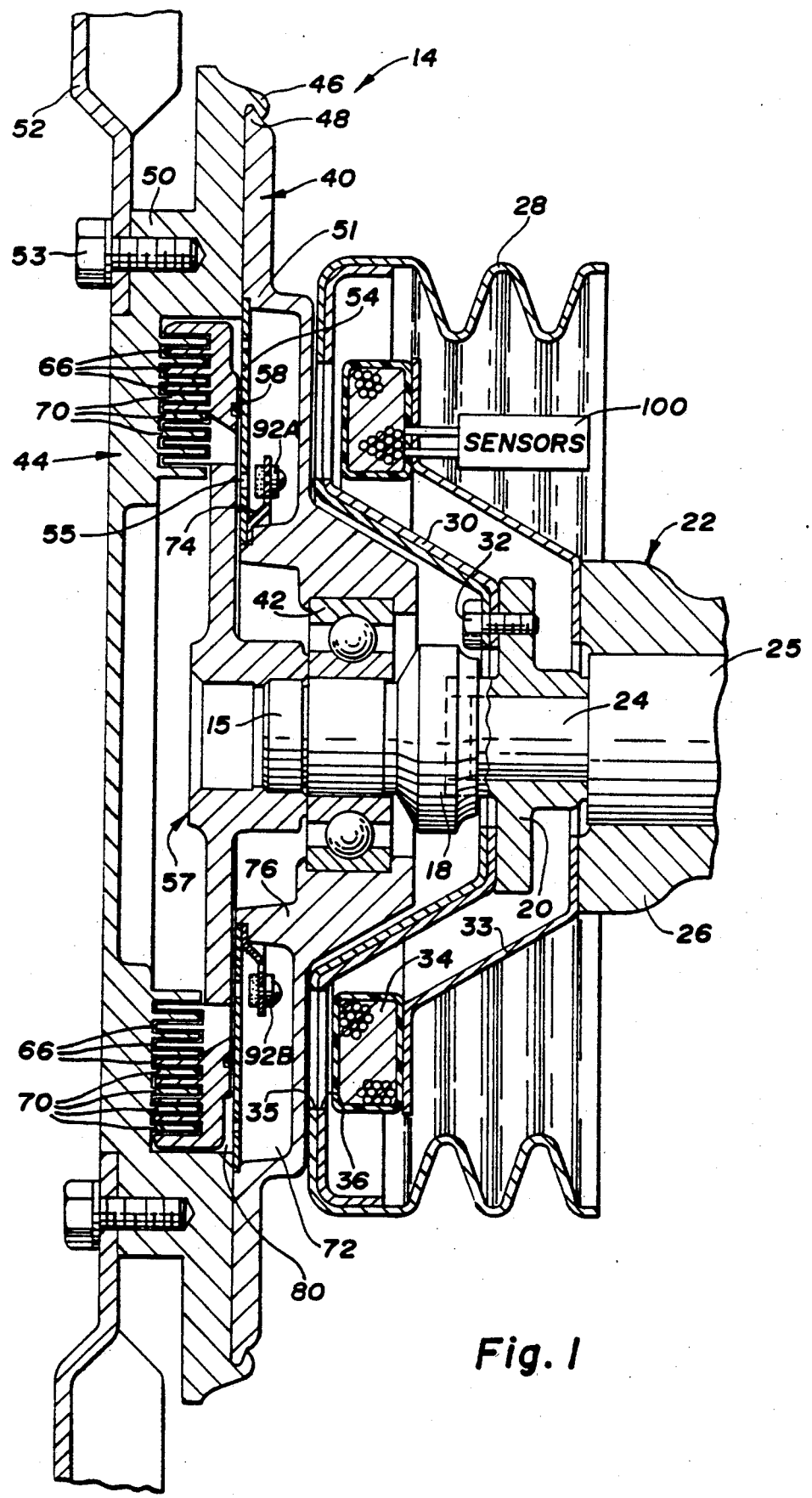
FIG. 1 is a sectional view through a viscous fluid fan clutch and blade assembly mounted on an input shaft and incorporating an electromagnetically actuated valve plate of the present invention illustrated in the deflected and open position.

FIG. 1 illustrates a multi-bladed fan and clutch assembly, indicated generally at 14, for drawing cooling air through the core of a vehicle radiator (not illustrated) through which engine cooling fluid is circulated. The fan and clutch assembly 14 is mounted on the outboard end of a rotatably driven shaft 15 whose inboard end terminates in an adapter 18.

The adapter 18 is fitted to a collar 20 of a conventional water pump assembly 22, partially illustrated in FIG. 1. The collar 20 is mounted onto a drive shaft 24 of the water pump assembly 22 which drives an impeller (not illustrated) in a well-known manner. The drive shaft 24 is received in a bearing 25 contained in the water pump housing 26. A sheave 28 and support 30 are secured to the collar 20 by a plurality of threaded fasteners 32, only one of which is illustrated in FIG. 1. The sheave 28 receives and is driven by a belt (not illustrated) in a well-known manner.

A snap ring 33 is mounted on the stationary housing 26. An electromagnetic coil 34 is secured to the snap ring 33. In the areas of the sheave 28 and support 30 adjacent the coil 34, openings 35 and 36, respectively, are provided. The functions of the coil 34 and openings 35 and 36 are described below.

The fan and clutch assembly 14 includes a dished main body 40 centrally mounted for rotation on shaft 15 by a bearing 42. A dished cover plate 44 is mounted to a front face of and cooperates with the main body 40 to form a housing and reservoir as described below. The cover plate 44 is secured to the main body 40 by an annular retainer lip 46 spun over from the material of the cover plate 44 to retain the annular outer edge 48 of the main body 40. The cover plate 44 is formed with a plurality of radially extending bosses 50 to which a multi-bladed fan 52 (partially illustrated in FIG. 1) is attached by threaded fasteners 53. A plurality of fins (not illustrated) can be provided on the outer surfaces of the main body 40 and cover plate 44 to dissipate heat transferred from a viscous fluid housed by the assembly 14.

A disk-like annular pump plate 54 is provided between the main body 40 and the cover plate 44. The pump plate 54 is drivingly secured to the main body 40 as it is trapped on an annular shoulder 51 (FIG. 2) on the main body 40 by the cover plate 44.

The pump plate 54 has a pair of diametrically opposed passages or gates 55 provided in its central portion. When opened, gates 55 allow the fluid to flow into a collecting chamber 56 (illustrated best in FIG. 2) formed and bounded by the pump plate 54, a clutch plate 57 and a divider ring 58. The clutch plate 57 is mounted on shaft 15 at a central opening and provides for the hydraulic drive of the main body 40. Ring 58, preferably formed from TEFLON, is mounted in an annular groove 59 in the outer or front face of the clutch plate 57.

Figure 2:
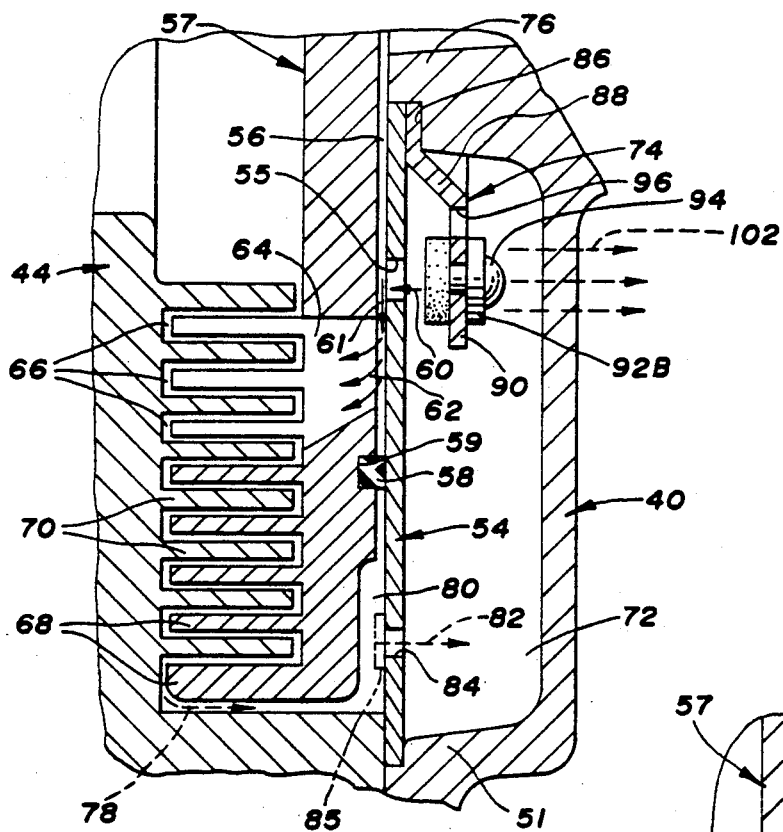
FIG. 2 is an enlarged view of a portion of the clutch assembly of FIG. 1 illustrating fluid flow from a receiving through a pump plate.

As illustrated in FIG. 2, the centrifugal forces of the rotating assembly 14 force the axial fluid flow indicated by directional arrow 60 through the gate 55 to radial fluid flow indicated by directional arrow 61 into the collecting chamber 54.

Axial flow fluid indicated by directional arrow 62 is forced through well-known passages 64 in the clutch plate 57 into an annular serpentine fluid shear zone 66 formed by the grooves or spaces between interleaved concentric annular ridges or lands 68 formed in a rear face of the clutch plate 57 and complementary concentric annular ridges or lands 70 formed on an interior surface of the cover plate 44.

Fluid sheared in the shear zone 66 transmits input torque from the rotatably driven clutch plate 57, centrally mounted on shaft 15, to provide for the hydraulic drive of the cover plate 44 and the attached bladed fan 52 for cooling fan operation. Due to slippage between the clutch plate 57 and the cover plate 44, the fan speed is always less than the input speed from the shaft 15.

A reservoir 72 formed between the main body 40 and the pump plate 54 contains a specified quantity of viscous fluid. The opening and closing of the gates 55 to control the supply of the fluid into the collecting chamber 56 is provided by a valve plate 74 mounted on a hub portion 76 formed in the central portion of the main body 40. The actuation of the valve plate 74 is described below.

In FIG. 2, fluid indicated by directional arrow 78 is forced radially outwardly by centrifugal forces and exits the shear zone 66 into a receiving chamber 80 formed and bounded by the pump plate 54, the clutch plate 57 and the divider ring 58. Fluid indicated by directional arrow 82 in the receiving chamber 80 is pumped to the reservoir 72 through a plurality of orifices 84 provided in a portion of the pump plate 54 in communication with the receiving chamber 80. Preferably, a wiper 85 (illustrated in phantom in FIG. 2 for purposes of clarity of illustration) is provided on the pump plate 54 adjacent each orifice 84 to improve to pump-out of fluid 82 in a well-known manner.

Figure 4:
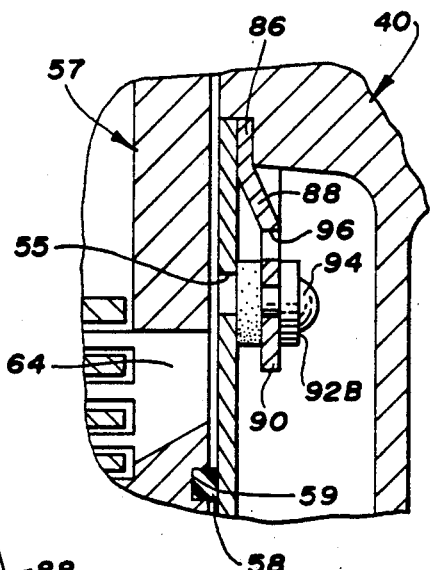
FIG. 4 enlarged view similar to FIG. 2 wherein the valve plate is illustrated in the closed position.
Figure 3:
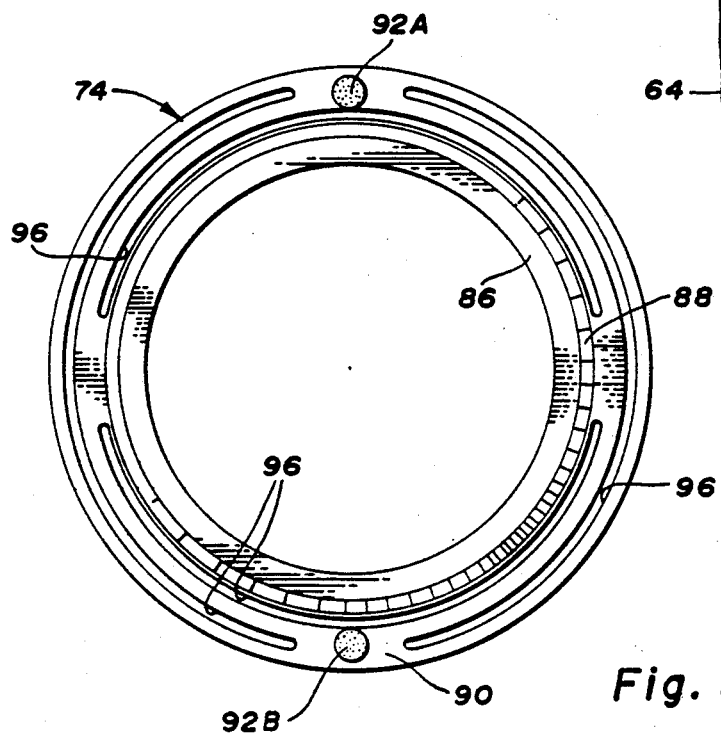
FIG. 3 is an enlarged top plan view of the present flexible va plate removed from the clutch assembly of FIG 1.

The valve plate 74 is constructed from a thin, flexible, ferromagnetic material, preferably metal. As illustrated in FIG. 2, 3 and 4, the valve plate 74 includes an inner region 86 trapped between the pump plate 54 and the main body 40, an angled ramp 88 and an outer region 90. A pair of stopper elements 92A and 92B are mounted in the outer region 90 and can be secured to the valve plate by any suitable manner, including rivets 94. The stopper elements 92A and 92B are constructed from a material capable of providing a fluid seal, preferably rubber, and are aligned with corresponding gates 55 in the pump plate 54. To increase the flexibility of the valve plate 74, a plurality of arcuate slots 96 are provided in the outer region 90.

In operation, sensors 100 can be strategically placed in an engine compartment and connected to an electronic control module or computer to activate the electromagnetic coil 34. When energized, the coil 34 creates a magnetic flux, indicated by arrows 102 in FIG. 2. The flux 102 attracts the valve plate 74 so that the outer region 90 is pulled toward the coil 34. As the outer region 90 deflects, stopper elements 92A and 92B are pulled away from respective gates 55. This open position, illustrated in FIGS. 1 and 2, permits fluid to flow from the reservoir 72 to the shear zone 66, thereby engaging the cover plate 44 and the attached fan 52. When the coil is de-energized, the outer region 90 returns to the closed position illustrated in FIG. 4, wherein the stopper elements 92A and 92B seal their respective gates 55. When the gates 55 are closed, fluid is pumped from the shear zone 66 and the cover plate 44 and attached fan 52 are disengaged from the clutch plate 40.

Openings 35 and 36 in the sheave 28 and support 30, respectively, reduce the amount of material and mass between the coil 34 and the valve plate 74. A reduction of material permits the use of a less powerful flux 102 to deflect the valve plate 74, thereby decreasing the size of the coil 34 required for this assembly 14.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A bladed fan and viscous fluid clutch assembly for inducing a flow of cooling air through a radiator in which engine coolant is circulated, the assembly comprising:
    (a) an input shaft adapted to be rotatably driven;
    (b) a clutch plate, rotatably driven by the input shaft, having a plurality of axially extending and concentric lands forming grooves therebetween;
    (c) a body, rotatably mounted on the input shaft, having a plurality of axially extending and concentric lands forming grooves therebetween, the body lands and grooves mated with the clutch plate lands and grooves to form a shear zone;
    (d) axial flow passages in the lands and grooves of the clutch plate to permit the flow of fluid from a reservoir to the shear zone;
    (e) a pump plate separating the reservoir from a receiving chamber, the receiving chamber receiving fluid exiting from the shear zone;
    (f) gate means provided in the pump plate for permitting the passage of fluid from the reservoir to the shear zone;
    (g) orifice means provided in the pump plate for permitting the passage of fluid from the receiving chamber to the reservoir;
    (h) a flexible, ferromagnetic valve plate fixedly trapped between the pump plate and the body for controlling fluid flow through the gate means, wherein the valve plate comprises
        an inner region trapped between the pump plate and the body;
        an outer region having a plurality of arcuate slots; and
        an angled ramp connecting the inner region with the outer region; and
    (i) means for creating a magnetic flux capable of attracting at least a portion of the valve plate to open the gate means.

2. The assembly as specified in claim 1 wherein sealing means are mounted on the outer region and aligned with respective gate means for blocking fluid flow at the gate means when the magnetic flux is not activated.

* * * * *